United States Patent [19]
Irizarry

[11] Patent Number: 5,967,096
[45] Date of Patent: Oct. 19, 1999

[54] SPUR GLOVE FOR BIRDS

[76] Inventor: Pedro Irizarry, 11361 Wadsworth Rd., Beach Park, Ill. 60099

[21] Appl. No.: 08/926,081

[22] Filed: Sep. 2, 1997

Related U.S. Application Data

[63] Continuation-in-part of application No. 08/757,800, Nov. 27, 1996, abandoned.

[51] Int. Cl.$^6$ .................................................. A01K 29/00
[52] U.S. Cl. ............................................................ 119/851
[58] Field of Search .................................... 119/715, 837, 119/851

[56] References Cited

U.S. PATENT DOCUMENTS

| | | | |
|---|---|---|---|
| 1,467,769 | 9/1923 | Tagert | 119/837 X |
| 2,197,537 | 4/1940 | Cheeley | 118/851 |
| 3,224,412 | 12/1965 | Fuentes, Jr. | 119/851 |
| 3,273,540 | 9/1966 | Fuentes, Jr. | 119/851 |
| 4,432,545 | 2/1984 | Vanderpool | 119/851 |
| 4,962,731 | 10/1990 | Wexler | 119/851 |
| 5,317,074 | 5/1994 | Hammar et al. | 433/18 |
| 5,613,951 | 3/1997 | Meyer et al. | 604/110 |

OTHER PUBLICATIONS

Cover and p. 29 of Gut and Steel Magazine dated Apr., 1993.
Cover and p. 7 of The Gamecock Magazine dated Jan., 1996.

*Primary Examiner*—Peter M. Poon
*Assistant Examiner*—Elizabeth Shaw
*Attorney, Agent, or Firm*—Jansson, Shupe, Bridge & Munger, Ltd

[57] ABSTRACT

A device for shrouding the spur of a fowl includes a spur cover having an outer surface. In the improvement, such outer surface is seam-free. The cover is made of molded material which is homogeneous between the wall of the spur-receiving cavity and the cover outer surface. A highly preferred device has a generally cylindrical cover and cylindrical spur-receiving cavity and the cover and attaching straps are integrally molded as a unitary structure.

15 Claims, 3 Drawing Sheets

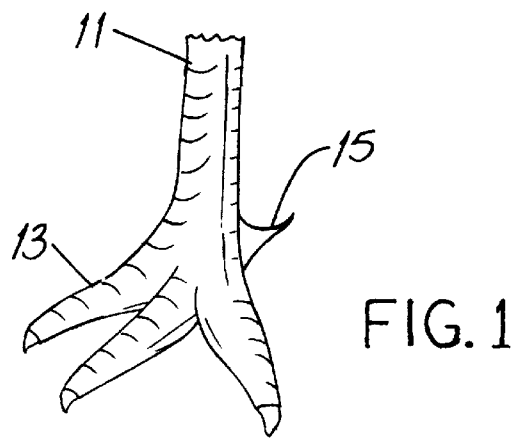
FIG. 1
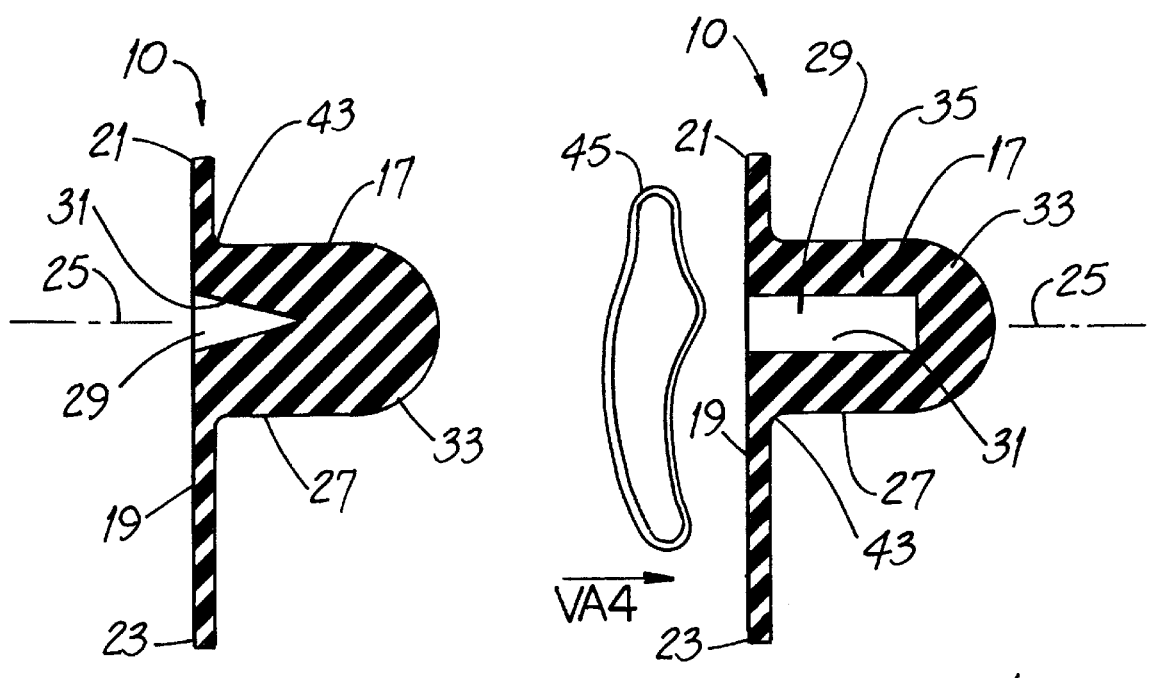
FIG. 2
FIG. 3

SPUR GLOVE FOR BIRDS

RELATED APPLICATION

This application is a continuation-in-part of application Ser. No. 08/757,800 filed Nov. 27, 1996 and now abandoned.

FIELD OF THE INVENTION

The invention relates generally to animal husbandry and, more particularly, to body-worn protective shields used in connection with birds and bird handling.

BACKGROUND OF THE INVENTION

While the legs of many species of birds are free of spurs or have only vestigial spurs, other bird species such as pheasants, turkeys and chickens have very pronounced spurs. And birds with spurs instinctively know how to use them in defense or aggression.

In the cases of mass-produced farm birds, e.g., chickens and turkeys, raised for human or animal food, injuries caused by other birds are of scant concern. And, of course, it is not possible to prevent birds in the wild from injuring (or perhaps even killing) one another with their spurs.

But in the matter of birds which are specially bred for show or in anticipation of a prize or recognition, injury is a greater (often much greater) concern. As an example, a specially-bred prize turkey may be worth several hundred dollars when the bird is free of injury and become essentially worthless if, say, it is blinded in one eye by the spur of another bird. And it should be appreciated that birds are relatively fragile—it takes very little by way of a scratch or blow from a spur to inflict injury, especially to the eye.

The matter of potential injury is aggravated by the fact that, often, two or more birds are kept in a single cage. And some breeds of birds tend to be more high-strung and "edgy" than others and have a propensity to fight when so caged.

Some breeders of birds remove substantially the entirety of both leg spurs and the bird is thereby said to have "slipped spurs." But a vestigial stump remains and birds instinctively use that part of the leg for defense or aggression. Therefore, covering the vestigial stumps can be important in preventing bird injury.

To help prevent spur-related injuries to birds, spur "muffs" have been available for many years. A popular muff has a generally spherical outer cover made of sewn vinyl or leather and having four seams spaced about 90° apart. Such outer cover is stuffed with a padded fabric liner having a depression which receives the spur when the muff is fitted to the leg of the bird.

A strap made of vinyl or leather has an opening through which the cover fits and the stuffed cover and strap are sewn together at the cover-strap junction. One of the straps has an elastic band (i.e., a band comprised of both fabric and rubber) attached to it. To affix the muff, the cover is fitted over the spur, the strap ends are wrapped about the leg of the bird and the elastic band is wrapped and looped over the cover to hold the muff in place.

While such known muffs have been generally satisfactory for their intended purpose, they are not without disadvantages. For example, their manufacture is labor intensive and requires a good deal of hand fitting and sewing. But more to the point of injury prevention, each seam represents a slightly-raised discontinuity in the surface of the cover and to the human touch, such seams are perceptibly harder than the adjacent cover material and are themselves believed to be the cause of some injuries.

And hardness of seams is not the only concern. Muffs made of leather become noticeably harder as to the non-seamed portion when the muff is repeatedly wetted and then allowed to dry. Such hardness alone, absent any concerns relating to seams, can function to convert the muff from a protective cover to something of a weapon.

Whether or not the cover is made of sewn vinyl or leather, the thin outer cover becomes scuffed or "scabbed" in normal usage. This adverse change in surface texture can be a contributor to injury.

Yet another disadvantage of known spur muffs is that the surface of the strap which contacts the bird's leg is relatively smooth. As a consequence, such strap has little resistance to slipping on the leg.

Still another disadvantage of known muffs relates to the elastic band which is more-or-less permanently connected to one of the muff straps. Like most elastic products, the band tends to "go slack" over time and become less effective as a holding device. And when its effectiveness diminishes to an intolerable level, the band must be cut or pulled from the strap and a replacement effected.

A new spur shrouding device which addresses shortcoming of the prior art would be an important advance in the field of animal husbandry.

OBJECTS OF THE INVENTION

It is an object of the invention to provide a spur shrouding device overcoming some of the problems and shortcomings of the prior art.

Another object of the invention is to provide a spur shrouding device which has a smooth outer surface.

Another object of the invention is to provide a spur shrouding device which is easily made by machine.

Yet another object of the invention is to provide a spur shrouding device which is unaffected by water.

Another object of the invention is to provide a spur shrouding device which resists scuffing and scabbing.

Another object of the invention is to provide a spur shrouding device with a leg-wrapping strap which resists slipping.

Still another object of the invention is to provide a spur shrouding device which, in one embodiment, is attached using a separate, easily-replaced rubber band.

Yet another object of the invention is to provide a spur shrouding device which, in another embodiment, is self-securing.

Still another object of the invention is to provide a spur shrouding device that is capable of being easily stretched around a bird's leg.

Another object of the invention is to provide a spur shrouding device that is highly durable and capable of repeat usage. How these and other objects are accomplished will become apparent from the following descriptions and from the drawings.

SUMMARY OF THE INVENTION

The invention relates to a device for shrouding the spur of a bird to prevent the bird from injuring other birds. The device includes a bulb-like spur cover having an outer surface and in the improvement, the outer surface is seam-free. Remarkably, the absence of even a single small seam makes the device itself much less likely to injure another bird.

In another aspect of the invention, the cover has an interior cavity for receiving the spur of the bird to which the device is fitted. The cavity has a wall, the cover is made of molded material and the material is homogeneous between the wall and the outer surface. To put it in other words, there is no "layering" in the construction of the cover or, for that matter, in the construction of the cover retaining strap noted below.

While the cover may be generally spherical or otherwise shaped, a highly preferred cover is cylindrically-shaped. And while the spur-receiving cavity in the cover may be tapered and pointed to generally conform to the shape of a bird's spur, a highly preferred cavity is also cylindrically-shaped. When the cover and cavity are conformably shaped, the wall of the cover is of generally uniform thickness and resilience along its length. Such construction helps avoid "hard spots" that may characterize an overly-thick cover wall.

In yet another aspect of the invention, the cover has a retaining strap attached to it. Such strap has surface discontinuities, e.g., cross-hatching, stippling or the like, which resists slippage when the strap is wrapped about the leg of the bird. Most preferably, the retaining strap and the cover are integrally molded as a unitary structure. That is, the junction of the strap and cover is smooth, i.e., free of a rough seam which may injure another bird.

In a highly preferred embodiment of the invention, the retaining strap and cover are integrally molded with one another and the strap has an aperture that fits over and around the spur cover. In a specific version of this embodiment, the aperture is circular.

Most preferably, the molded material used to make the device (by injection molding) has a Shore A hardness no greater than 20 (preferably about 13) and a percent elongation of at least 300%, preferably about 600%.

The new device helps protect birds from injury including, for example, injury from sparring for breeder's purposes and otherwise. Other details of the new device are set forth in the following description and in the drawings.

BRIEF DESCRIPTION OF THE DRAWINGS

FIG. 1 is a representation in perspective of the foot, leg and spur of a bird. The leg is broken away.

FIG. 2 is a sectional view of one embodiment of the new device taken along the viewing plane A—A of FIG. 5.

FIG. 3 is a sectional view of another embodiment of the new device taken along the viewing plane A—A of FIG. 5 and shown in conjunction with a rubber band.

DETAILED DESCRIPTIONS OF PREFERRED EMBODIMENTS

Before describing the new shrouding device 10, it will be helpful to understand aspects of the anatomy of a bird of the type having spurs. FIG. 1 shows the leg 11 and foot 13 of a bird such as a turkey, chicken or pheasant. A sharply-pointed spur 15 projects rearwardly and upwardly from the leg-foot junction and it is the unshrouded spur 15 which is capable of inflicting injury to other birds.

Figure 6:
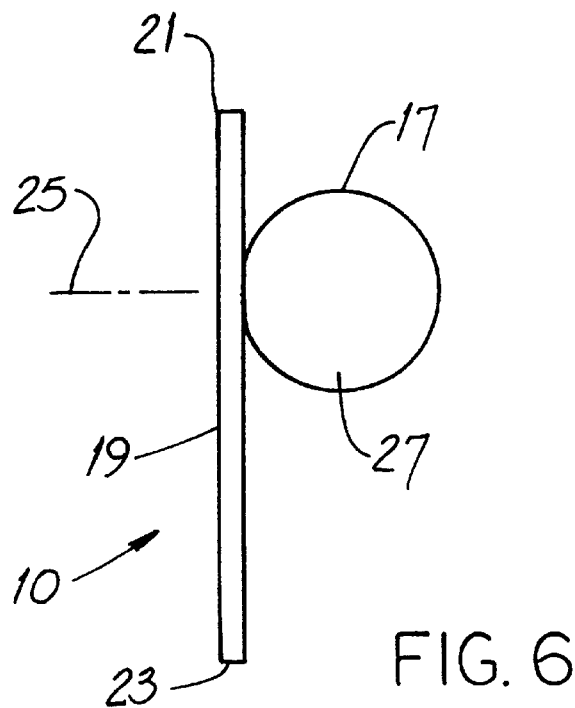
FIG. 6 is a side elevation view of another embodiment of the new device.

Referring next to FIGS. 2, 3, 4 and 5, the new spur-shrouding device 10 has a spur cover 17 with a flexible strap 19, the ends 21 and 23 of which extend laterally to the long axis 25 of the cover 17 in the views of FIGS. 2, 3 and 6. In a highly preferred embodiment, the cover 17 and strap 19 are integrally molded with respect to one another to form a one-piece device 10. As an example of a suitable way to make the device 10 and of a suitable material (such as Dynaflex® G6713 manufactured by GLS Corp., in Illinois), the device 10 is injection molded of material having a hardness on the Shore A scale no greater than 20 (preferably about 13) and a percent elongation of at least 300%, preferably about 600%.

The cover is bulb-like and is spherical as shown in FIG. 6 or, most preferably, is cylinder-shaped as shown in FIGS. 2 and 3. And other shapes are contemplated without departing from the spirit of the invention. The outer surface 27 of the cover 17 is free of seams; that is to say, there are no significant surface discontinuities, either raised or depressed, as with prior art muffs of the above-described sewn type.

Figure 4:
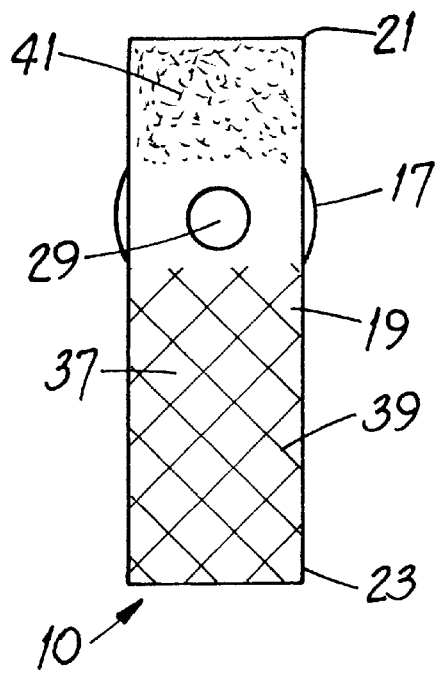
FIG. 4 is an elevation view of the new device taken along viewing axis VA4 of FIG. 3.
Figure 5:
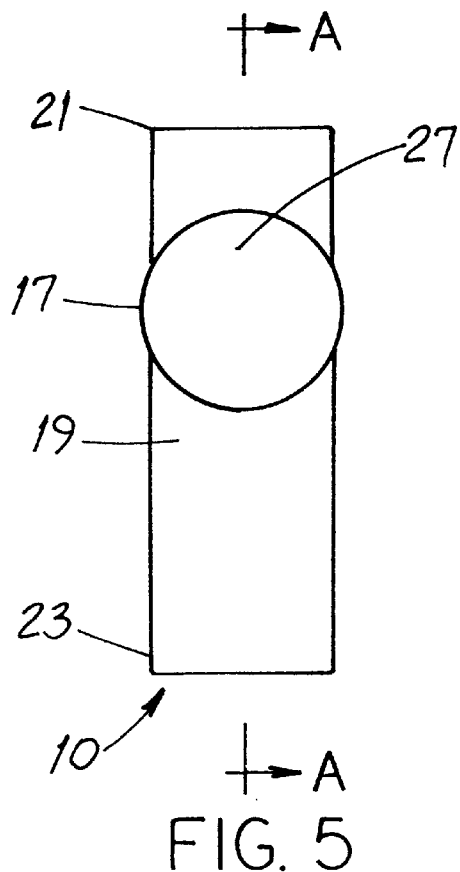
FIG. 5 is an elevation view of the new device taken along an axis parallel to the viewing axis VA4 of FIG. 3 but viewing in the opposite direction.

Referring to FIGS. 2, 3 and 4, the cover has an interior cavity 29 for receiving the spur 15 of the bird to which the device 10 is fitted. The cavity 29 has a wall 31 and the material 33 is homogeneous between the wall 31 and the outer surface 27. To put it in other words, the wall 31, the surface 27 and the material 33 between the wall 31 and the surface 27 are all of the same material 33.

As shown in FIG. 3, a highly preferred cavity 29 is cylinder shaped. When the cover 17 and cavity 29 are generally conformably shaped as in FIG. 3, the portion 35 of the device 10 between the cavity wall 31 and the outer surface 27 is of generally uniform thickness and resilience along most of the length of the cover 17. The cover 17 thereby exhibits substantially uniform resilience along most of its length. As shown in FIG. 2, the spur-receiving cavity 29 in the cover 17 may be tapered and pointed to generally conform to the shape of a bird's spur 15.

Referring particularly to FIG. 4, the retaining strap 19 has a slip-resistant surface 37 embodied as surface discontinuities, e.g., cross-hatching 39, stippling 41 or the like, which resists slippage when the strap 19 is wrapped about the leg 11 of the bird. And as is most evident in FIGS. 2 and 3, the junction 43 of the strap 19 and cover 17 is smooth, i.e., free of a rough seam which may injure another bird. And, optionally, the device 10 may include a separate rubber band 45 to hold the device 10 in place after the strap 19 has been wrapped upon the leg 11 of the bird.

It is to be noted from FIGS. 2–6 that the strap end 23 is somewhat longer than the strap end 21. To attach the device 10 to a bird, the cover 17 is slipped over the spur 15 so that the spur 15 is received in the cavity 29. The shorter strap end 21 is wrapped first about the leg 11 of the bird and then the longer strap end 23 is wrapped to overlay the end 21. The rubber band 45 (which, of course, can be quickly replaced when worn or broken) is then looped about the device 10 to hold it in place.

Figure 7:
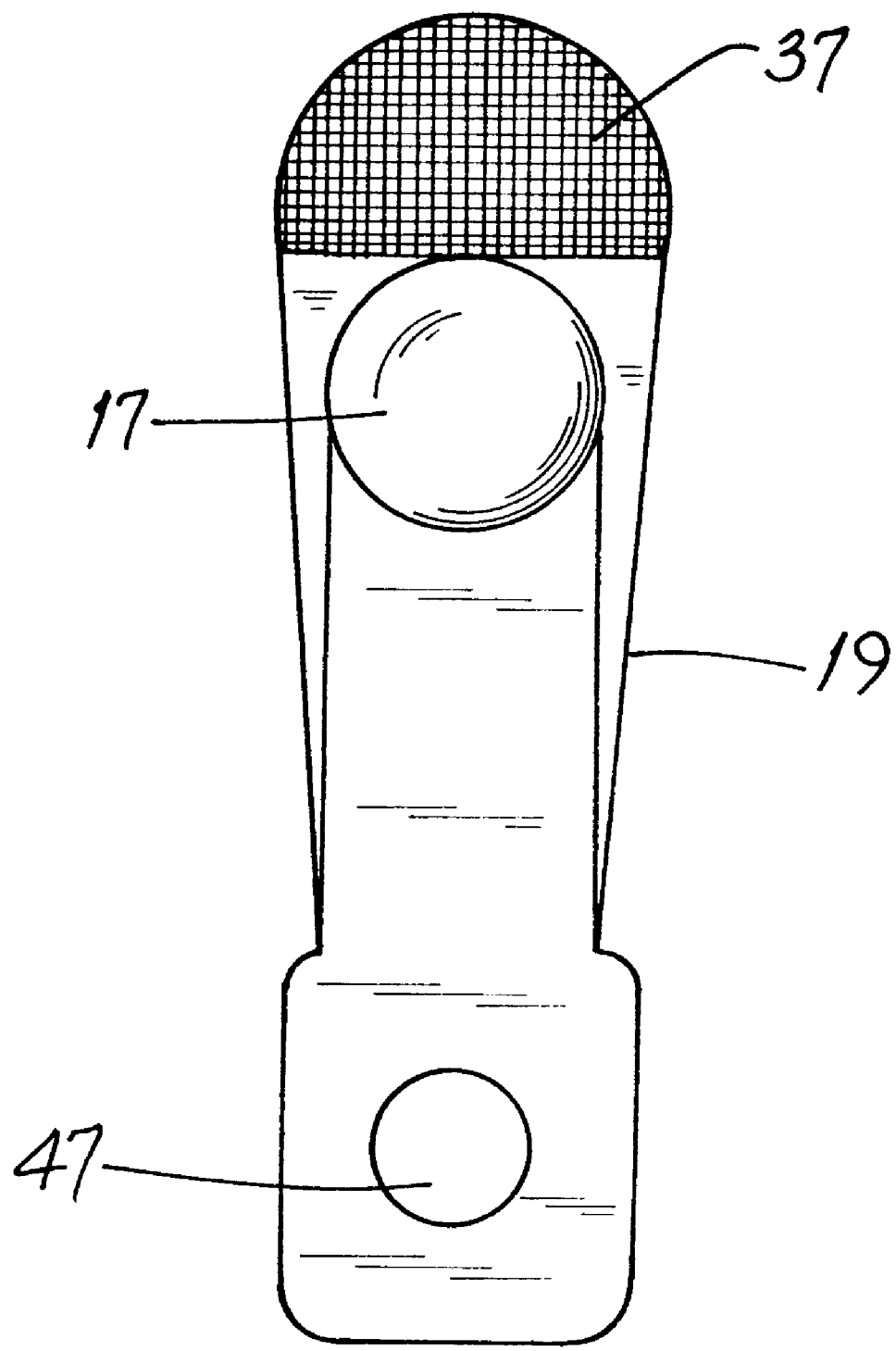
FIG. 7 is an elevation view of the new device taken along an axis parallel to the viewing axis of VA4 of FIG. 3 but viewing in the opposite direction showing an aperture in the extension strap.

Referring to FIG. 7, a more preferred embodiment of the device 10 has an integrally-molded retaining strap 19 with an aperture 47 that fits over the spur cover 17. The cover cavity 29 is shaped as shown in FIG. 2 or FIG. 3. In a specific version of this embodiment, the aperture 47 is circular. Such embodiment allows the spur cover 17 to be self-securing thereby eliminating the need for a rubber band 45 or other securing object. In an even-more-specific version of this embodiment, the side of the retaining strap 19 opposite the spur cover 17 has a slip-resistant surface 37 of the type shown in FIG. 4.

In still another preferred embodiment of the invention, the molded material used in the construction of the device has a Shore A hardness no greater than 20 and a percent elongation of at least 300%. This allows the device to be stretched repeatedly without weakening or breaking. It has been demonstrated that the device embodying the integral retaining strap is capable of being applied and removed to a bird's leg well in excess of one thousand times without breaking.

While the principles of the invention have been shown and described in connection with a few preferred embodiments, it is to be understood clearly that such embodiments are by way of example and are not limiting.

What is claimed is:

1. A device for shrouding the spur of a fowl, comprising:

a spur cover having an outer surface free of seams, the spur cover including a cavity therein for receiving the spur of the fowl; and a retaining strap attached to the spur cover and having first and second opposite faces, the first face including surface discontinuities thereon, wherein the retaining strap is formed from an elastic material and has an aperture therein such that the spur cover may be inserted through the aperture.

2. The device of claim 1 wherein:

the cavity in the spur cover is defined by a wall;

the spur cover is made of molded material; and the molded material is homogeneous between the wall and the outer surface of the spur cover.

3. The device of claim 1 wherein the cavity in the spur cover is cylindrically-shaped.

4. The device of claim 1 wherein the spur cover is cylindrically-shaped.

5. The device of claim 1, wherein the retaining strap is made of molded material and wherein both the retaining strap and the spur cover are integrally molded as a unitary structure.

6. The device of claim 5 wherein:

the molded material has a Shore A hardness no greater than 20; and a percent elongation of at least 300%.

7. The device of claim 1, wherein the aperture is circular.

8. A device for shrouding the spur of a fowl, comprising:

a spur cover having an outer surface free of seams, the spur cover including a cavity therein for receiving the spur of the fowl; and a retaining strap attached to the cover for retaining the spur cover on the fowl, the retaining strap formed from an elastic material and having an aperture therein such that the spur cover may be inserted through the aperture.

9. The device of claim 8 wherein the retaining strap includes a first face having surface discontinuities thereon in order to prevent slippage of the retaining strap on the fowl.

10. The device of claim 8 wherein the aperture is circular.

11. The device of claim 8 wherein:

the cavity in the spur cover is defined by a wall;

the spur cover is made of molded material; and the molded material is homogeneous between the wall and the outer surface of the spur cover.

12. The device of claim 8 wherein the cavity in the spur cover is cylindrically-shaped.

13. The device of claim 8 wherein the spur cover is cylindrically-shaped.

14. The device of claim 8 wherein the retaining strap is made of molded material and the spur cover are integrally molded as a unitary structure.

15. The device of claim 14 wherein:

the molded material has a Shore A hardness no greater than 20; and a percent elongation of at least 300%.

\* \* \* \* \*